US007580710B2

United States Patent
Katz et al.

(10) Patent No.: US 7,580,710 B2
(45) Date of Patent: *Aug. 25, 2009

(54) ROUTE NOTIFICATION WHEN INTEGRATING INSTANT MESSAGING SYSTEMS AND SENSORS

(75) Inventors: Neil A. Katz, Parkland, FL (US); Victor S. Moore, Lake City, FL (US); Justyna M. Nowak, Wayne, PA (US)

(73) Assignee: International Business Machines Corporation, Armonk, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/380,932

(22) Filed: Apr. 30, 2006

(65) Prior Publication Data

US 2007/0254669 A1    Nov. 1, 2007

(51) Int. Cl.
*H04W 40/00* (2009.01)
(52) U.S. Cl. .................. 455/445; 455/466; 455/404.2; 455/456.1; 370/328; 370/338
(58) Field of Classification Search ............ 455/445, 455/466, 404.2, 456.1; 370/328, 338
See application file for complete search history.

(56) References Cited

U.S. PATENT DOCUMENTS

| 6,678,750 | B2 | 1/2004 | Meade, II et al. |
| 7,224,960 | B2* | 5/2007 | Giacalone et al. ............ 455/410 |
| 2002/0160745 | A1 | 10/2002 | Wang |
| 2002/0194498 | A1 | 12/2002 | Blight et al. |
| 2003/0046273 | A1 | 3/2003 | Deshpande |
| 2003/0060214 | A1 | 3/2003 | Hendrey et al. |
| 2003/0235164 | A1 | 12/2003 | Rogers et al. |
| 2004/0023663 | A1 | 2/2004 | Shah et al. |
| 2004/0098464 | A1 | 5/2004 | Koch et al. |
| 2004/0203866 | A1 | 10/2004 | Sahinoglu et al. |
| 2005/0060377 | A1 | 3/2005 | Lo et al. |
| 2005/0068166 | A1 | 3/2005 | Baker |
| 2007/0254641 | A1* | 11/2007 | Katz et al. ............... 455/422.1 |

OTHER PUBLICATIONS

Kanter, HotTown GeoBots—Attaching Context-Aware Services to (Moving) Locations, Submission to IEEE Internet Computing/CFP Mobile Applications, Mar./Apr. 2003.
López et al., ANTS Framework for Cooperative Work Environments, Computer, pp. 2-8 (Mar. 2003).
Jensen, Research Challenges in Location-Enabled M-Services, Proceedings Third International Conference on Mobile Data Management MDM 2002, pp. 3-7 (2002).

(Continued)

*Primary Examiner*—Nghi H Ly
(74) *Attorney, Agent, or Firm*—Cuenot, Forsythe & Kim, LLC (57) ABSTRACT

A method of providing route notification to sensors within an Instant Messaging (IM) network can include estimating one or more travel route of a user having a mobile device that is IM enabled, wherein the estimated route specifies at least one future location, identifying one or more sensors within a predetermined distance of a point along the travel route(s), notifying the sensor(s) of the approaching user via the IM network, and collecting sensor information for each of the one or more sensor in anticipation of the approaching user.

20 Claims, 4 Drawing Sheets

OTHER PUBLICATIONS

Al-Muhtadi et al., Socializing in the Mist: Privacy in Digital Communities, Dept. of Computer Science, Univ. of Illinois at Urbana Champaign, Technical Report UIUCDCS-R-2002-2271 (Apr. 2002).

Cruickshank et al., A Portal for Interacting with Context-Aware Ubiquitous Systems, Univ. of Southampton, UK, http://pace.dstc.edu.au/cw2004/Paper20.pdf (2004).

Method for Distributing and Geographically Load Balancing Location Aware Communication Device Client-Proxy Applications, Dossier AUS920030690.

PDA location alarms, IBM Research Disclosure, No. 453109, p. 94 (Jan. 2002).

\* cited by examiner

ROUTE NOTIFICATION WHEN INTEGRATING INSTANT MESSAGING SYSTEMS AND SENSORS

FIELD OF THE INVENTION

The present invention relates to the use of sensors with Instant Messaging (IM) technology.

DESCRIPTION OF THE RELATED ART

Instant Messaging (IM) is a form of electronic communication which involves substantially immediate correspondence between two or more users who are all online simultaneously. In general, IM is a type of communication service that enables a user to create a private chat room with another individual. Unlike electronic mail, IM messages are provided to the recipient in real time or in near-real time. Typically, the IM system or network alerts users whenever other individuals on the user's private list have a presence online, thereby allowing the user to chat, or IM, with that individual.

IM systems focus primarily upon facilitating computer interactions between users. Efforts have been directed to extending the types of services available through IM communications. For example, the realm of communications conducted over IM systems recently has expanded to encompass interactive software agents called "bots". Bots are computer programs that, oftentimes, are built upon artificial intelligence (Ai) technology. Still, bots can be built upon other technologies, and as such, are not limited to reliance solely upon Ai. In any case, bots can interact with users via an IM network and attempt to simulate communications with a live person.

Despite the expansion of IM services, IM remains largely a technology directed at communications between two or more users. It would be beneficial, however, to provide a technique that facilitates the use of IM technology in obtaining information about the physical world.

SUMMARY OF THE INVENTION

The embodiments disclosed herein provide methods, systems, and apparatus for providing route notification to one or more sensors used with an Instant Messaging (IM) system. One embodiment of the present invention can include a method of providing route notification to sensors within an IM network. The method can include estimating one or more travel routes of a user having a mobile device that is IM enabled, wherein the estimated route specifies at lesat one future location, identifying one or more sensors within a predetermined distance of a point along the travel route(s), notifying the sensor(s) of the approaching user via the IM network, and collecting sensor information for each of the one or more sensors in anticipation of the approaching user.

Another embodiment of the present invention can include a system for providing route notification to sensors within an IM network. The system can include a location service that determines locations of a user having an IM enabled mobile device and a route probability and policy service that estimates at least one travel route for the user and identifies at least one sensor proximate to the travel route(s). The system further can include a messaging service that informs the identified sensor(s) that the user is approaching via the IM network.

Yet another embodiment of the present invention can include a machine readable storage, having stored thereon a computer program having a plurality of code sections for causing a machine to perform the various steps and implement the components and/or structures disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
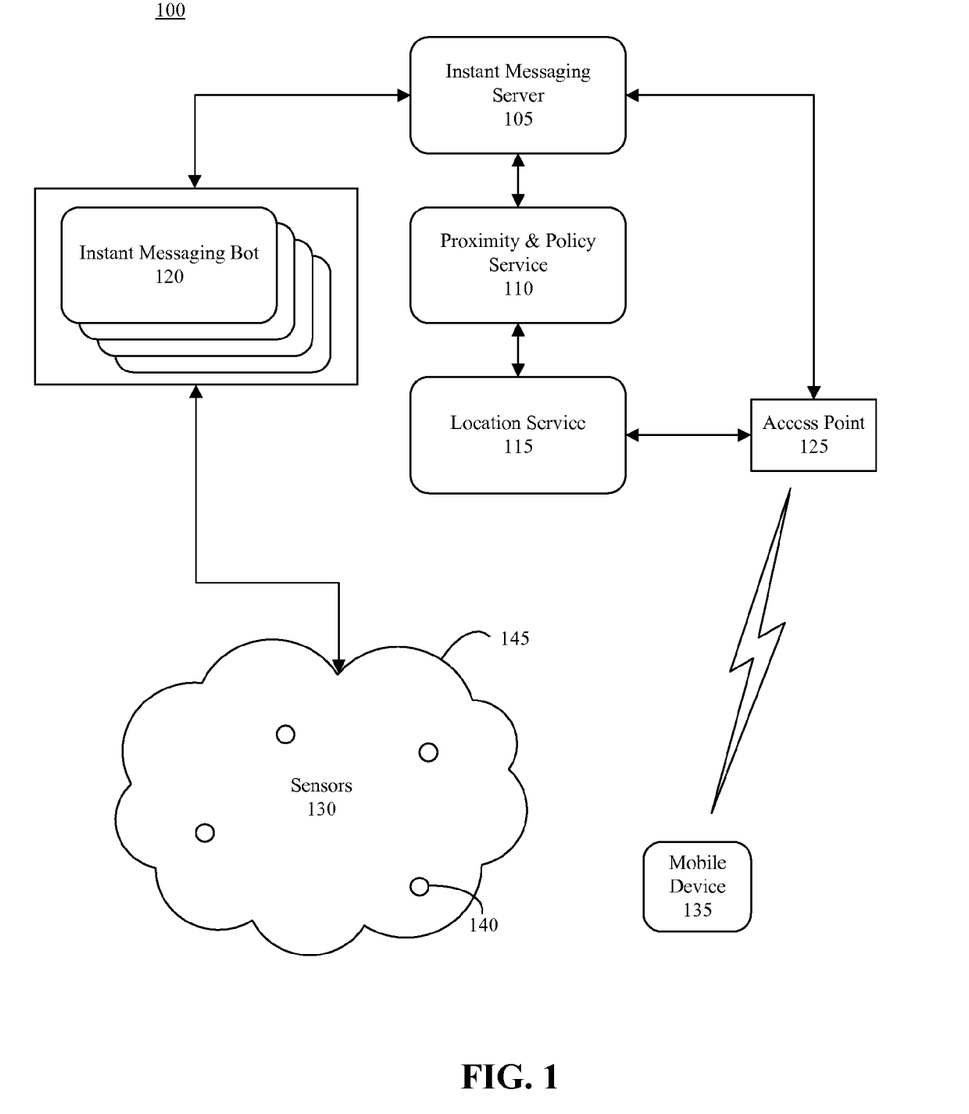
FIG. 1 is a schematic diagram illustrating an Instant Messaging (IM) system in accordance with one embodiment of the present invention.

FIG. 1 is schematic diagram illustrating an Instant Messaging (IM) system 100 in accordance with one embodiment of the present invention. System 100 can include an IM server 105, a Proximity & Policy Service (PPS) 110, a Location Service 115, and a plurality of IM bots 120. Further, the system can include an access point 125 as well as one or more sensors 130, which may form, or be part of, a sensor network 145.

While the embodiments described herein can be used with stationary computing devices, such as desktop computers and the like, system 100 is described with reference to mobile computing devices such as mobile device 135. As used herein, a mobile computing device, or mobile device, can include, but is not limited to, a mobile phone, a wireless personal digital assistant, a wireless enabled laptop computer, or the like. Any suitable wireless communication device can be used so long as such a device includes, or executes, an IM client configured to interact with the IM server 105 and/or the various other systems described herein.

Access point 125 can be any of a variety of appropriately configured access points capable of wirelessly communicating with mobile device 135. Access point 125 can interface mobile device 135 with one or more other networks, whether the Internet, a telecommunications network, a mobile telecommunications network, a data network, or the like. For example, access point 125 can be configured to communicate via any of the IEEE 802 series of communication protocols with mobile device 135. In another example, access point 125 can be implemented as a base station to communicate with mobile device 135. In any case, access point 125 can communicate with mobile device 135 via any of a variety of wireless protocols and/or technologies and translate such communications into one or more other networking protocols for communicating with such networks including system 100 and/or the various IM related components described herein.

IM server 105 facilitates IM communications between one or more users. IM communication can refer to information carried over an IM network and/or system, information formatted using an IM protocol, or both. In facilitating communications, IM server 105 can monitor presence information for various users, whether communicating through a mobile device or not. As such, IM server 105 can maintain a listing of users having a presence online as well as any attributes relating to each user's account or profile. IM server 105 further can facilitate IM communications between various users communicating through a communication device having an IM client, whether such device is a mobile device 135 or a stationary communication system, one or more IM bots 120, or various combinations thereof. Accordingly, IM server 105 can route messages, whether commands, instructions, IM messages, or the like, among the communication devices, i.e. mobile device 135, corresponding to one or more users as well as one or more IM bots 120.

Location Service 115 tracks a variety of different items of information pertaining to users and/or sensors 130. With respect to users, Location Service 115 can maintain location information for various users such as the user of mobile device 135. The location information can be updated from time to time or periodically as the case may be using any of a variety of different location detection techniques. Further, Location Service 115 can maintain historical location information for mobile device 135 and/or the user associated therewith. It should be appreciated that while reference is made to the "location of mobile device 135" from time to time, the location of mobile device 135 is tantamount to the location of the user of such device since a user is logged on to the IM server 105 via mobile device 135. The location of the user can be inferred from the location of the user's mobile device 135 and vice versa.

In one embodiment, where mobile device 135 is suitably equipped, the location of mobile device 135 can be determined using Global Positioning System (GPS) technology. In that case, mobile device 135 can send location information to Location Service 115 periodically, from time to time, or responsive to a request from Location Service 115 or another system. In another embodiment, the location of mobile device 135 can be determined through the use of triangulation techniques commonly used in the context of mobile telecommunications, i.e. cell communications. In yet another embodiment, the location of mobile device 135 can be estimated according to the particular access point 125 through which mobile device 135 communicates. In any case, the particular manner in which the location of mobile device 135 is determined, or the frequency in which such information is updated, is not intended to limit the present invention in any way.

In addition to monitoring the location of mobile device 135, Location Service 115 can maintain or store the location of individual ones of the sensors 130. In one embodiment, sensors 130 can be stationary. In that case, Location Service 115 can be programmed with location information for stationary sensors. In another embodiment, however, depending upon the application, it may be desired that one or more of sensors 130 be mobile in nature. In that case, the location of such mobile sensors can be determined using any of a variety of different location detection techniques as previously described.

PPS 110, based upon the location information maintained by Location Service 115, can determine the proximity of a user to one or more sensors 130. Thus, if mobile device 135 is within a predetermined distance of one or more sensors 130, mobile device 135 can be said to be "proximate" to such sensor(s) 130. PPS 110 further can maintain one or more policies which regulate user access to the various IM bots 120 and/or corresponding sensors 130.

In one embodiment, each policy can be associated with a particular user, mobile device, and/or IM client. The policy for a particular user can specify which of sensors 130 the user is able to access, the proximity within which each sensor is to become available, as well as other conditions regulating the user's access to sensors 130 such as times and dates when each sensor may be available, and the like. In illustration, if one or more sensors 130 are located in a hospital and are used to monitor various aspects of a patient's health, it is necessary to limit the field of users that can access such sensors. For example, access to patient specific sensors can be limited to only the patient's doctor(s) and other selected members of the medical staff.

The IM bots 120 serve as programmatic interfaces to the various sensors 130. The IM bots 120 effectively serve as an interface and link sensors 130 with IM server 105 and other components of system 100. Each sensor 130, for example, can be associated with a particular IM bot 120. Accordingly, each IM bot 120 can be programmed to interact with a sensor 130 to instruct it to gather data or particular items of information, reset, send sensed information and/or diagnostic information, or the like.

In operation, as a user equipped with mobile device 135 moves or travels, Location Service 115 can continually monitor and update location information for the user of mobile device 135. As noted, Location Service 115 further can maintain historical location information for the user. PPS 110 can process the location information from Location Service 115 and determine which sensors 130, if any, the user of mobile device 135 can access based upon the policy, or policies, maintained therein. For sensors 130 that are accessible by the user, IM server 105 can facilitate communications between the user, and thus mobile device 135, and any IM bot(s) 120 associated with such sensor(s) 130.

In one embodiment, for example, as mobile device 135 approaches a particular sensor 130, i.e. sensor 140, PPS 110 can determine that sensor 140 is available to mobile device 135, or its user, in accordance with an established policy. As noted, the policy can account for a variety of parameters including, but not limited to, the user's identity, the particular type of mobile device being used, the time, date, proximity, etc. PPS 110 can inform IM server 105 that mobile device 135 is permitted to access sensor 140. Accordingly, IM bot 120 that corresponds to sensor 140 can appear within the IM client of mobile device 135 as any other IM participant that is available for IM communications would appear. Still, it should be appreciated that identifiers presented within the IM client that represent IM bots 120 can be distinguished from identifiers corresponding to users if so desired. Further, such identifiers can provide an indication as to the type of information that can be obtained via IM bot 120 and/or the type of sensor with which IM bot 120 interacts.

Other examples of possible applications of system 100 can include, but are not limited to, obtaining recent information regarding remote experiments pertaining to environmental studies, biological studies, or the like. Yet another application can be, for example, monitoring pipelines and dispatching maintenance crews via IM communications responsive to detection of particular events by the sensors. System 100 can be implemented to operate in outdoor environments covering large geographical areas, in indoor environments, or in various combinations of both outdoor and indoor environments.

Figure 2:
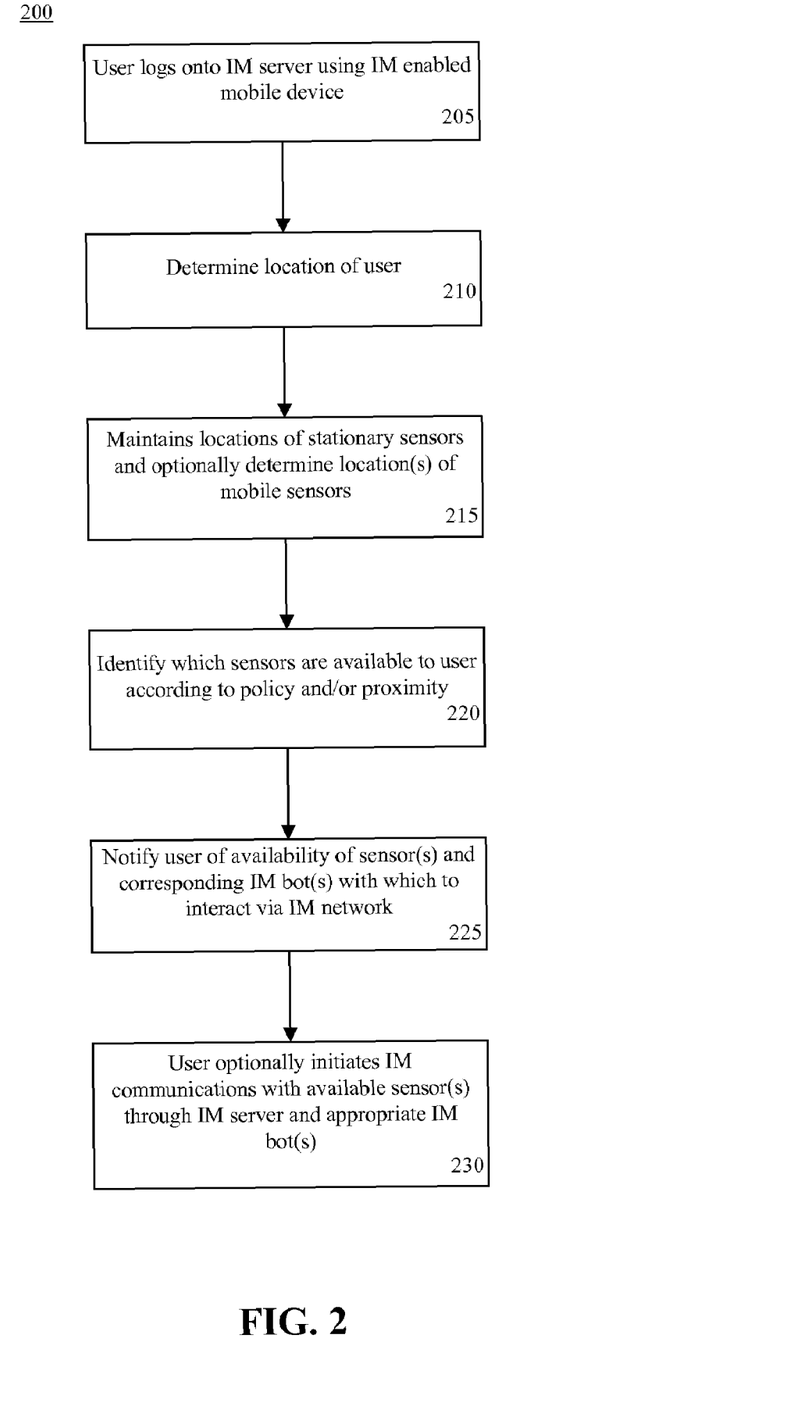
FIG. 2 is a flow chart illustrating a method of incorporating one or more sensors into an IM network and/or system in accordance with another embodiment of the present invention.

FIG. 2 is a flow chart illustrating a method 200 of incorporating one or more sensors into an IM network in accordance with another embodiment of the present invention. Method 200 can be performed using a system such the system illustrated with reference to FIG. 1. Accordingly, method 200 can begin in a state where a user is operating a mobile device that is IM enabled. Thus, in step 205, the user can log onto the IM server using his or her mobile device. Once logged on, the user has a presence within the IM network.

In step 210, the Location Service can determine the location of the user. In step 215, the Location Service can continue to maintain the location(s) of various stationary sensor(s). Further, if any mobile sensors are included in the sensor network, the Location Service can determine the location of any such mobile sensors.

In step 220, the PPS can identify which sensors are available to the user. In one embodiment, the PPS can identify or select only those sensors that are within a predetermined range of the location of the mobile device, and thus the user. As noted, such sensors can be determined to be "proximate" to the user. In another embodiment, the PPS can identify only those sensors that the user is allowed, or permitted, to access as determined by a policy. The policy can account for a variety of different parameters, which may include proximity, to determine which sensors a user may access.

In step 225, the user can be notified of the availability of any sensors as determined by the PPS. In one embodiment, the IM server can advise the user as to the availability of any sensors by sending a notification, via the IM network, to the IM client within the user's mobile device. The IM client can present an identifier representing the sensor and/or IM bot, as the case may be, thereby indicating that the sensor and IM bot are available to the user for IM communication. In step 230, the user optionally can initiate IM communications with available sensor(s) through his or her IM client within the mobile device. The communications can be sent via the IM server and to appropriate IM bot(s). Communication between the user and the IM bots can take place as conventional IM communications would among multiple users. The IM bot can be configured to respond to various queries based upon keywords, Natural Language Understanding technology, or the like.

The IM bot can interpret instructions or queries received from the user via the IM network and translate that data into one or more commands and/or instructions that are understandable by the sensor associated with the IM bot. Accordingly, the sensor can respond with requested data, which can be processed and/or formatted by the IM bot and then forwarded on to the requesting user as an IM communication. It should be appreciated that data obtained by the sensor can be sent as an IM message or appended to an IM message as an attachment. Such can be the case, for example, in the event that the sensor collects audio, video, or audiovisual material. Such recordings can be passed along as an attachment to an IM message, for example.

Figure 3:
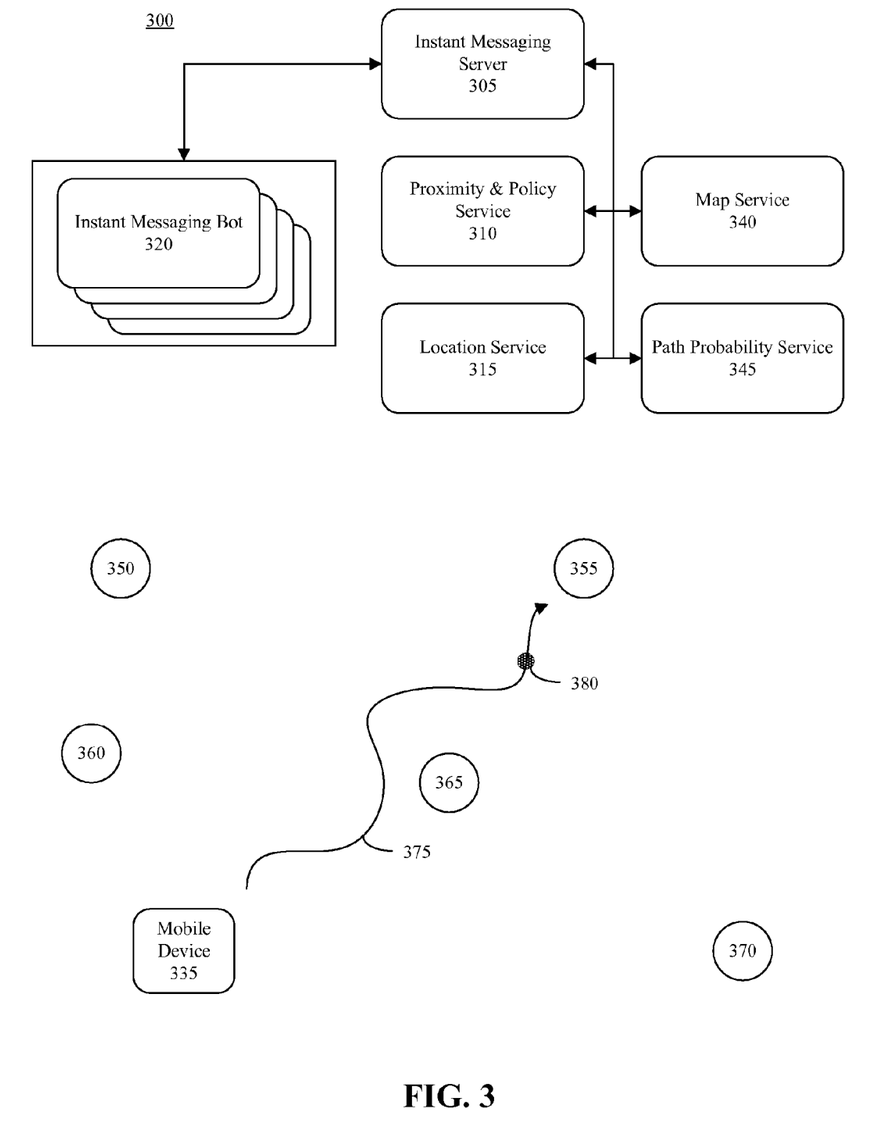
FIG. 3 is a schematic diagram illustrating a system for providing route notification in accordance with another embodiment of the present invention.

FIG. 3 is a schematic diagram illustrating a system 300 for providing route notification in accordance with another embodiment of the present invention. System 300 is substantially similar to that of FIG. 1 in terms of IM server 305, PPS 310, Location Service 315, IM bot(s) 320, mobile device 335, and sensors 350-370. As shown, additional services in the form of a Map Service 340 and a Path Probability Service (Path Service) 345 have been added.

Map Service 340 can include a plurality of different maps corresponding to various areas in which the user may travel. Such maps can include climate maps, economic or resource maps, physical maps, political maps, road maps, and topographic maps. The Map Service 340 also can include maps detailing travel routes within structures, buildings, subways, etc. which indicate hallways, elevators, rooms, stairwells, and the like. Accordingly, while one or more different maps can represent areas in two dimensions, other maps can present information in three dimensions.

Path Service 345 can calculate a likely travel route or path 375 for a user. In one embodiment, the travel path can be expressed as a vector having both magnitude and direction. In another embodiment, the travel route can reflect a path with one or more turns, straight portions, inclines, declines, etc. The estimated travel route 375 can be calculated using any of a variety of different factors including, but not limited to, the current location of the user, historical location information, velocity, acceleration, direction, and one or more maps detailing the area in which the user is currently located, whether such maps pertain to indoors, outdoors, or both.

Thus, any estimates of the user's future location at a given time, or of the travel route, can be compared and/or cross-referenced against one or more maps for that region or location. Thus, if the user is currently outdoors, but the estimated travel route will place that user inside of a structure at a selected time in the future, a map of the structure can be used to further refine the travel route.

In one embodiment, Path Service 345 can calculate a probability that the user will actually travel along the estimated travel route. For a travel route having a probability that exceeds a predetermined threshold, sensors along, or proximate to, that travel route can be identified. Thus, for example, if the probability of the user taking an estimated travel route is greater than the threshold, sensors along that travel route, or within a predetermined distance of points along that travel route, can be identified.

For example, Path Service 345 can estimate a travel route 375 for the mobile device 335. Accordingly, Path Service 345 further can calculate that there is a greater than 70% chance, for example, of the user being located at location 380 at a given time in the future, or of taking travel route 375 in general. Path Service 345 can identify sensors 365 and 355 as being proximate to the user of mobile device 335 at some point in the near future based upon travel route 375. Further, it can be determined that the user associated with mobile device 335 has access to sensors 365 and 355 as previously described. Path Service 345 can send a message to the IM bots 320 associated with each of sensors 355 and 365 via IM server 305 notifying the IM bots of sensors 355 and 365 of the anticipated arrival to the user. Such instructions can, for example, cause the sensors to take readings so that information collected by the sensors is immediately available to a requesting user. This advance "refreshing" of the sensor(s) in anticipation of the arrival of the user allows sensors 355 and 365 to be more responsive to user queries since any information collected by the sensors has already been harvested and is immediately available upon user request.

Figure 4:
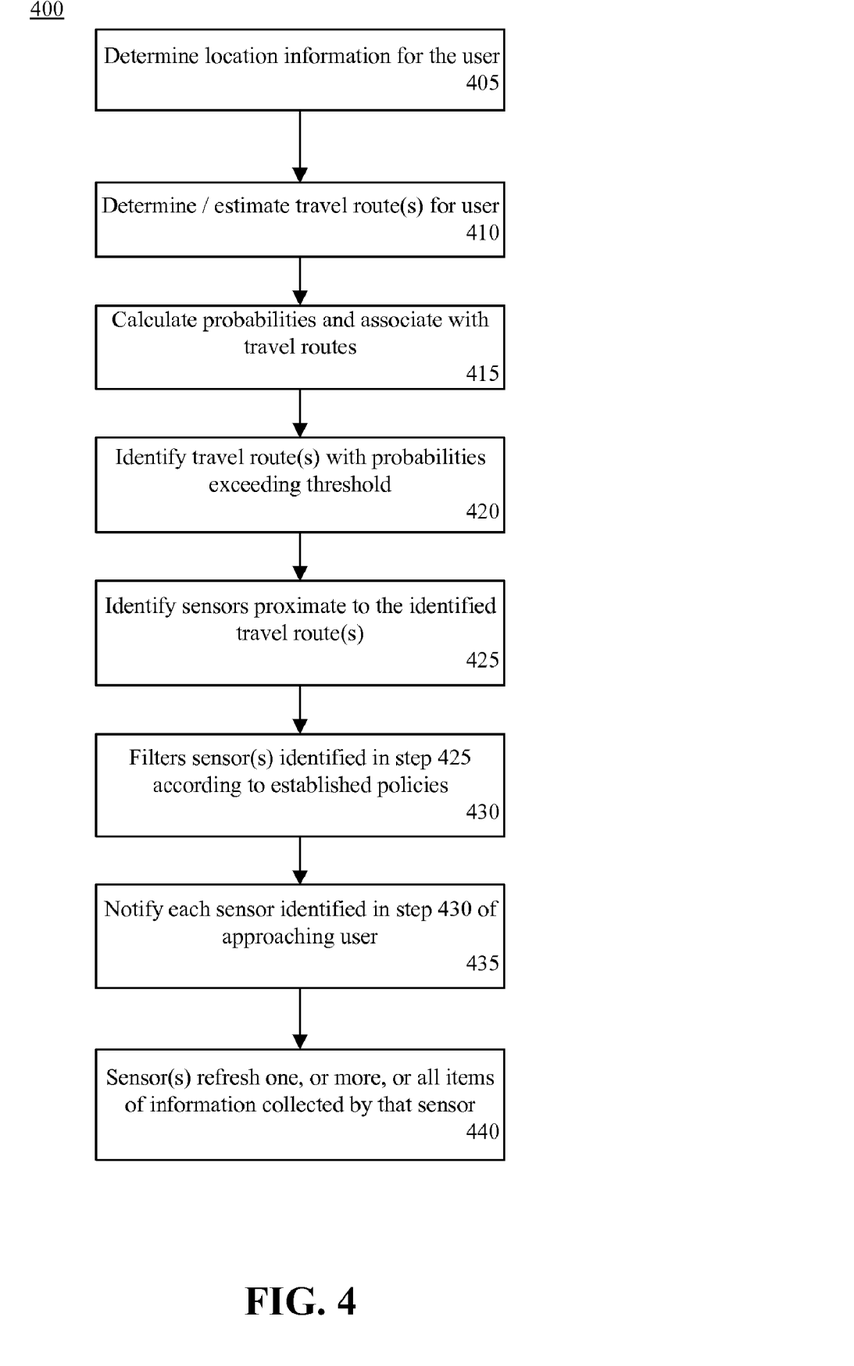
FIG. 4 is a flow chart illustrating a method of providing route notification in accordance with another embodiment of the present invention.

FIG. 4 is a flow chart illustrating a method 400 of providing route notification in accordance with another embodiment of the present invention. Method 400 can be performed using the system discussed with reference to FIG. 3, and further, incorporated into the system of FIG. 1. Accordingly, method 400 can begin in a state where a user is operating an IM enabled mobile device and has established a presence on an IM communication system and/or network. In step 405, location information for the user can be obtained. It should be appreciated that as the user travels, a log of historical location information can be maintained that can span time periods of seconds, minutes, hours, days, weeks, months, years, etc.

In step 410, one or more travel routes for the user can be estimated and/or predicated. As noted, estimated travel routes can be determined using any of a variety of parameters and established techniques. In one embodiment, such estimates can include a statistical component based upon historical location information maintained by the Location Service. For example, the Path Service can determine that based upon the last N times the user was at his or her current location, there is an X percent chance that the user will take a given travel route.

Estimates of travel routes of the user further can be based upon the direction, velocity, and/or acceleration of the user as well as historical location information collected over a specified period of time. As discussed, map information also can be used. In any case, it should be appreciated that the particular manner in which travel routes are estimated is not intended to limit the present invention in any way. As such, any of a variety of different travel route and/or location estimation techniques can be used.

In step 415, a probability can be calculated for each estimated travel route and associated with its corresponding travel route. Each probability indicates the likelihood that the user will actually travel the estimated route or be in an estimated location along that route at a given point in time. In step 420, those travel routes that have a probability higher than a predetermined threshold can be identified. For example, any travel routes that have a probability greater than 70% can be identified. It should be appreciated that in cases where the probability is set sufficiently low, a plurality of different travel routes can be identified.

In step 425, any sensors proximate to identified travel routes can be identified or selected. For example, any sensors located within a predetermined distance of a location on a travel route having a probability above the threshold of 70% can be identified. In step 430, from the sensors identified in step 425, those that the user is permitted to access according to established policies can be filtered or selected. In step 435, having identified sensors in step 430, the IM server, via the IM bots, can instruct each such sensor that the user may be coming into range. For example, the IM server can instruct each IM bot corresponding to a selected sensor to notify its associated sensor of the approaching user.

Accordingly, in step 440, each sensor selected in step 430 can refresh the information that is collected by that sensor, i.e. by taking readings or performing other tasks in advance of the user's approach. This advance processing allows each sensor effectively to be pre-loaded with the information that may be requested by the user when that user comes into range, thereby reducing the wait time for the user after requesting information from the sensor(s).

It should be appreciated that while the sensor can refresh all data that is collected by that sensor, in another embodiment, only particular items of information need be refreshed. For example, if the approaching user routinely asks for a particular subset of items of information collected by the sensor, the sensor can refresh only those items. This effectively allows the sensor(s) to refresh one or more particular items of information based upon the identity of the approaching user.

With the sensor having refreshed its data, the user, once in range, can request information from the sensor using IM communications. The IM bot can facilitate the exchange of information via IM. Because the sensor need not take further time collecting data requested by the user, such data can be provided back to the requesting user immediately without the added delay of first acquiring such data.

The embodiments described herein provide a solution for obtaining information about the physical world through IM communications. Sensor(s) that are within range of a user and that the user is permitted to access can be made available for communication through the user's IM client and IM communications. Moreover, by estimating the user's likely travel route(s), and identifying sensors along, or proximate to, such route(s), the sensors can be notified of the approaching user and collect information prior to the user's arrival.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of providing route notification to sensors within an Instant Messaging (IM) network comprising:
  estimating at least one travel route of a user having a mobile device that is IM enabled, wherein the estimated route specifies at least one future location;
  identifying at least one sensor within a predetermined distance of a point along the travel route;
  notifying the at least one sensor of the approaching user via the IM network; and collecting sensor information for each of the at least one sensor in anticipation of the approaching user.

2. The method of claim 1, further comprising outputting to the mobile device, via the IM network, sensor information collected by each of the at least one sensor.

3. The method of claim 2, wherein outputting to the mobile device, via the IM network, sensor information collected by each of the at least one sensor further comprises outputting sensor information selected according to the identity of the user.

4. The method of claim 1, wherein estimating at least one travel route further comprises computing a probability indicating a likelihood of being traveled by the user for each of the at least one travel routes.

5. The method of claim 1, further comprising:
receiving a query, via the IM network, from the mobile device directed to sensor information collected by at least one of the identified sensors; and
providing a response to the query to the mobile device, via the IM network, by the at least one sensor.

6. The method of claim 1, further comprising selectively notifying the user of the availability of a sensor within the IM network according to the distance of the mobile device of the user to the sensor.

7. The method of claim 1, wherein identifying sensors further comprises selecting only sensors that the user is permitted to access.

8. A system for providing route notification to sensors within an Instant Messaging (IM) network comprising:
a location service that determines locations of a user having an IM enabled mobile device;
a path probability and policy service that estimates at least one travel route for the user, wherein the estimated route specifies at least one future location, and identifies at least one sensor within a predetermined distance of a point along each of the at least one travel route;
a messaging service that informs the at least one identified sensor that the user is approaching via the IM network; and
a sensor that collects sensor information in anticipation of the approaching user.

9. The system of claim 8, further comprising a map service having a collection of maps comprising at least one of a geographic map or a map of a structure, wherein the path probability and policy service uses the collection of maps in estimating the at least one travel route for the user.

10. The system of claim 8, wherein the path probability and policy service computes a probability for each of the at least one travel routes, wherein each probability indicates a likelihood that the user will travel that travel route.

11. The system of claim 10, wherein the path probability and policy service selects only estimated travel routes having a probability above a predetermined threshold.

12. The system of claim 8, wherein the path probability and policy service further selects only sensors that the user is permitted to access.

13. The system of claim 8, further comprising an IM bot associated with the identified sensor, wherein responsive to being informed of the approaching user, the IM bot instructs the sensor, via the IM network, to refresh sensor information in anticipation of the approaching user.

14. A machine readable storage having stored thereon a computer program having a plurality of code sections comprising:
code for estimating at least one travel route of a user having a mobile device that is IM enabled, wherein the estimated route specifies at least one future location;
code for identifying at least one sensor within a predetermined distance of a point along the travel route;
code for notifying the at least one sensor of the approaching user via the IM network; and
code for collecting sensor information for each of the at least one sensor in anticipation of the approaching user.

15. The machine readable storage of claim 14, further comprising code for outputting to the mobile device, via the IM network, sensor information collected by each of the at least one sensor.

16. The machine readable storage of claim 15, wherein code for outputting to the mobile device, via the IM network, sensor information collected by each of the at least one sensor further comprises code for outputting sensor information selected according to the identity of the user.

17. The machine readable storage of claim 14, wherein the code for estimating at least one travel route further comprises code for computing a probability indicating a likelihood of being traveled by the user for each of the at least one travel routes.

18. The machine readable storage of claim 14, further comprising:
code for receiving a query, via the IM network, from the mobile device directed to sensor information collected by at least one of the identified sensors; and
code for providing a response to the query to the mobile device, via the IM network, by the at least one sensor.

19. The machine readable storage of claim 14, further comprising code for selectively notifying the user of an availability of a sensor within the IM network according to the distance of the mobile device of the user to the sensor.

20. The machine readable storage of claim 14, wherein the code for identifying sensors further comprises code for selecting only sensors that the user is permitted to access.

* * * * *

UNITED STATES PATENT AND TRADEMARK OFFICE
CERTIFICATE OF CORRECTION

PATENT NO. : 7,580,710 B2
APPLICATION NO. : 11/380932
DATED : August 25, 2009
INVENTOR(S) : Katz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 533 days.

Signed and Sealed this

Fourteenth Day of September, 2010

David J. Kappos
*Director of the United States Patent and Trademark Office*